United States Patent
Gehlot et al.

(10) Patent No.: US 7,131,132 B1
(45) Date of Patent: Oct. 31, 2006

(54) AUTOMATIC ACCESS DENIAL

(75) Inventors: Narayan Gehlot, Sayreville, NJ (US); Victor Lawrence, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 633 days.

(21) Appl. No.: 09/878,453

(22) Filed: Jun. 11, 2001

(51) Int. Cl.
*H04H 9/00* (2006.01)
*H04N 7/16* (2006.01)
*G06F 7/04* (2006.01)
*H04K 1/00* (2006.01)
*H04L 9/00* (2006.01)
*G06F 17/30* (2006.01)

(52) U.S. Cl. .............................. 725/10; 726/3; 726/28; 713/168

(58) Field of Classification Search ................ 713/166, 713/186; 348/77, 156; 709/204; 725/10–12, 725/25, 153, 28, 30; 369/713; 360/713; 726/3, 28
See application file for complete search history.

(56) References Cited

U.S. PATENT DOCUMENTS

| 4,858,000 | A | * | 8/1989 | Lu ................................ 725/12 |
| 5,012,515 | A | * | 4/1991 | McVitie ....................... 713/201 |
| 5,164,992 | A | * | 11/1992 | Turk et al. .................... 382/118 |
| 5,229,764 | A | * | 7/1993 | Matchett et al. ............ 340/5.52 |
| 5,550,928 | A | * | 8/1996 | Lu et al. ....................... 382/116 |
| 5,793,409 | A | * | 8/1998 | Tetsumura .................... 725/12 |
| 6,067,401 | A | * | 5/2000 | Abecassis .................... 386/125 |
| 6,185,682 | B1 | * | 2/2001 | Tang ............................ 713/168 |
| 6,434,259 | B1 | * | 8/2002 | Hamid et al. ................ 382/115 |
| 6,812,956 | B1 | * | 11/2004 | Ferren et al. ............. 348/14.08 |
| 6,889,382 | B1 | * | 5/2005 | Anderson ...................... 725/10 |
| 6,922,843 | B1 | * | 7/2005 | Herrington et al. ........... 725/30 |
| 6,968,565 | B1 | * | 11/2005 | Slaney et al. .................. 725/10 |
| 2002/0095586 | A1 | * | 7/2002 | Doyle et al. ................. 713/186 |
| 2002/0144259 | A1 | * | 10/2002 | Gutta et al. .................... 725/10 |
| 2004/0111739 | A1 | * | 6/2004 | Winegard ...................... 725/31 |

OTHER PUBLICATIONS

LinuxGuruz. "Free On-Line Dictionary of Computing", § Digital Versatile Disc, Jul. 1999, <http://www.linuxguruz.com/foldoc/foldoc.php?query=dvd&action=Search>.*
NSA. "N.S.A. Employee's Handbook", Mar. 2001, <http://web.archive.org/web/20010306050313/http://www.psychicspy.com/nsa.html>.*
Valenti, Jack. "MPA Movie Ratings History", Dec. 2000, <http://www.mpaa.org/movieratings/about/content.htm>.*

\* cited by examiner

Primary Examiner—Jacques H. Louis-Jacques
Assistant Examiner—Michael J. Simitoski

(57) ABSTRACT

A method for limiting access to a device to a particular authorized user. The method includes; obtaining visual data related to the appearance of a user of the device; processing the visual data to determine when the particular authorized user is present; allowing initial access to the device when the particular authorized user is present; allowing continued access to the device when the particular authorized user is present; and terminating access to the device when the particular authorized user is not present.

8 Claims, 12 Drawing Sheets

AUTOMATIC ACCESS DENIAL

FIELD OF THE INVENTION

The present invention relates to methods of limiting access to a device.

BACKGROUND OF INVENTION

In current times, the issue of security has become a significant concern. We strive to keep secure our homes, automobiles, credit cards, wallets, and purses. With the prevalence of electronic devices in our lives, controlling access to electronic devices has also gained great importance. On a daily basis, we often seek to limit access to our computers, be they home, office, desktop or laptop, bank automatic teller machines (ATM machines), as well as other devices. Further, with regard to entertainment devices such as televisions, video cassette recorders (VCRs), video disk players, and video games, parents often desire to limit the access of children to all or portions of these entertainment media used with these devices. Limiting control to these entertainment devices, for example, often takes the form of so-called parental locks.

Many of the methods used for limiting access to an electronic device may be unwieldy and cumbersome to use, and require manual input from the authorized user. Also, while these methods provide a way for a user to establish authorization for initial access to one of these devices, no method is provided for automatically limiting or denying access to the device once initial access has been granted. This scenario occurs if the original authorized user temporarily or permanently steps away from a device or, in the alternative, if an unauthorized user attempts to use the device along with the authorized user, but without the permission of the authorized user.

SUMMARY OF THE INVENTION

The present invention is directed to a method for automatically limiting access to a device to a particular user. The method includes obtaining visual data related to the appearance of a user of the device. The visual data is then processed to determine if the particular authorized user is present. Initial access to the device is allowed if the particular authorized user is present, and continued access is allowed if the particular authorized user is present. Access to the device is terminated if the particular authorized user ceases to be present.

In this manner, access to a device may be automatically initially granted if an authorized user is present. Continued access is allowed as long as the authorized user remains present, but is automatically terminated if the authorized user leaves. An authorized user may automatically gain access to a device, such as, for example, a computer, without having to remember or key in a password. As long as the authorized user is using the computer, continued access is allowed. Once the authorized user leaves the device, such as a computer, however, access is automatically terminated, and a secure user environment is provided.

The determination of whether or not an authorized user is present may be facilitated by the use of a camera to process visual data related to the user, although other biometric identity indicators could be used.

Further, the invention may be used to limit access to other devices besides a computer. Other devices that may have their access limited include a television, digital video disk (DVD) player, VCR, video game, or other similar entertainment device. With regard to a television, the method may be used to block viewing of programs deemed to be inappropriate for unauthorized users such as programs directed to adults, which are not meant to be viewed by children. In this manner, the so-called parental lock feature may be enabled and disabled automatically and conveniently without the need for the parent or other authorized user to have to remember and key in a code in order to enable the parental lock and also to repeat the process to disable this feature. Additionally, with the method and system of the present invention, continued access to an ATM machine could be limited.

In short, the teachings herein can be applied to any controllable device needing security measures applied thereto. Also, matching systems other than cameras could be used, such as, for example, retinal scanners, finger print readers, palm scanners or other biometric devices or systems, if suitable to the desired application.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE INVENTION

Figure 1:
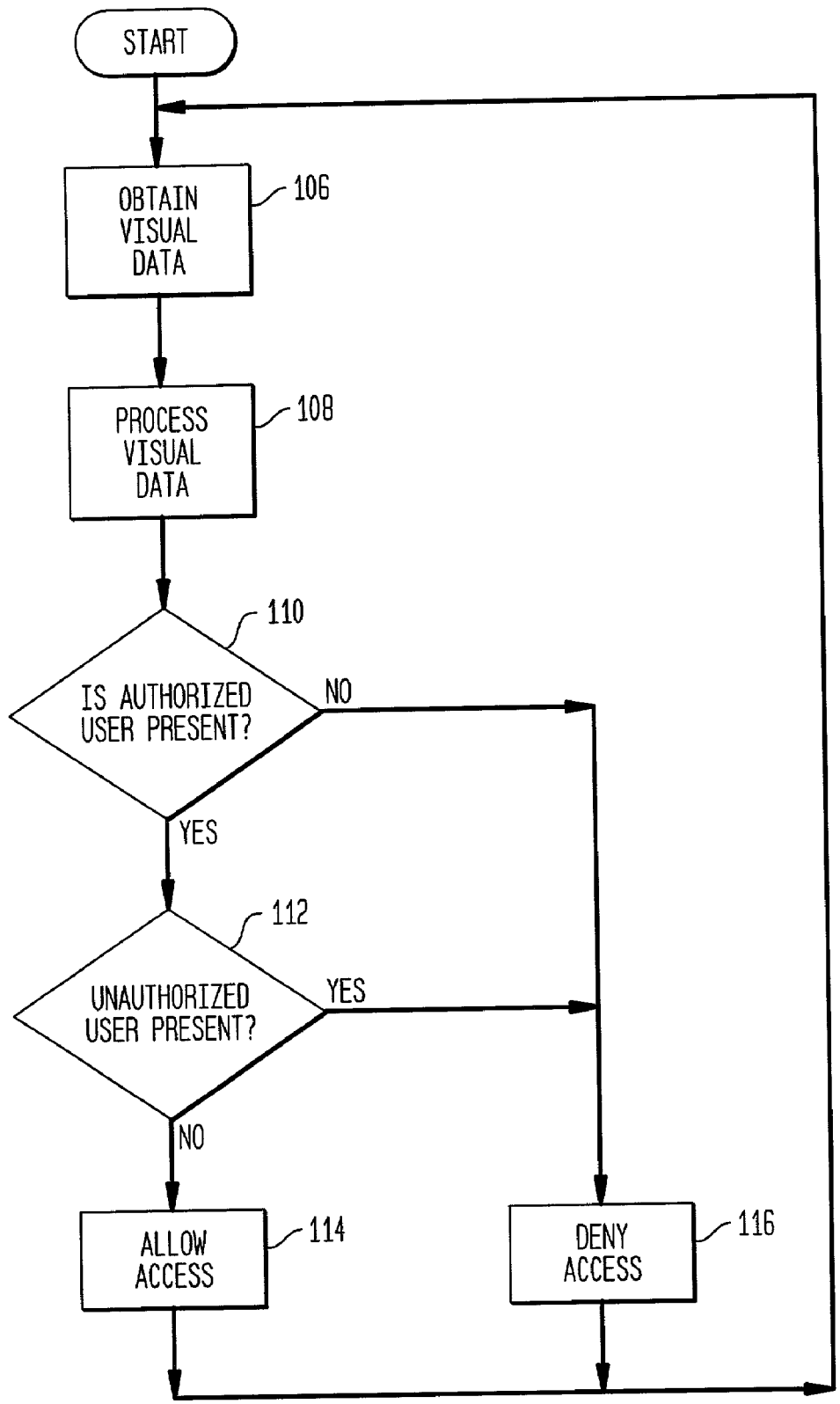
FIG. 1 is an exemplary flow diagram of an embodiment of the present invention.

Referring to FIG. 1, there is shown a flow diagram depicting an embodiment of the present invention. First, a camera or other visual data gathering device is used to obtain visual data regarding the user (as is shown in step 106). Next, the visual data is processed to determine if a particular authorized user is present (as is shown in step 108). Next a determination is made if the user is the particular authorized user (as is shown in step 110). The processing of the visual data may be performed by methods as are known in the art. The particular method used for determining if a user is a particular authorized user is a matter of application specific design choice, as would be determined by one skilled in the art. If the user is not the particular authorized user, then access is denied (as is shown in step 116). If, however, a user is present who is unauthorized (as is shown in step 114), then access is denied (as is shown in step 116). This method may be performed once, in order to initially determine if access should be allowed to a device. Alternatively, in an exemplary embodiment, the method is performed in a cyclic, recursive, or repeated manner with the visual data being obtained and processed on a regular periodic basis so that access may be controlled and limited on a continued basis. Visual data may be sampled, for example, at one second intervals. Longer or shorter sampling intervals, however, may also be satisfactory as may be deemed appropriate by one skilled in the art as a matter of design choice applying the teachings herein. Also, the sampling interval may be variable, with sampling being performed at longer or shorter intervals based on various circumstances such as, by non-limiting example, the time of day, the amount of people in the field of view, the subject matter that is being viewed, etc.

Figure 2:
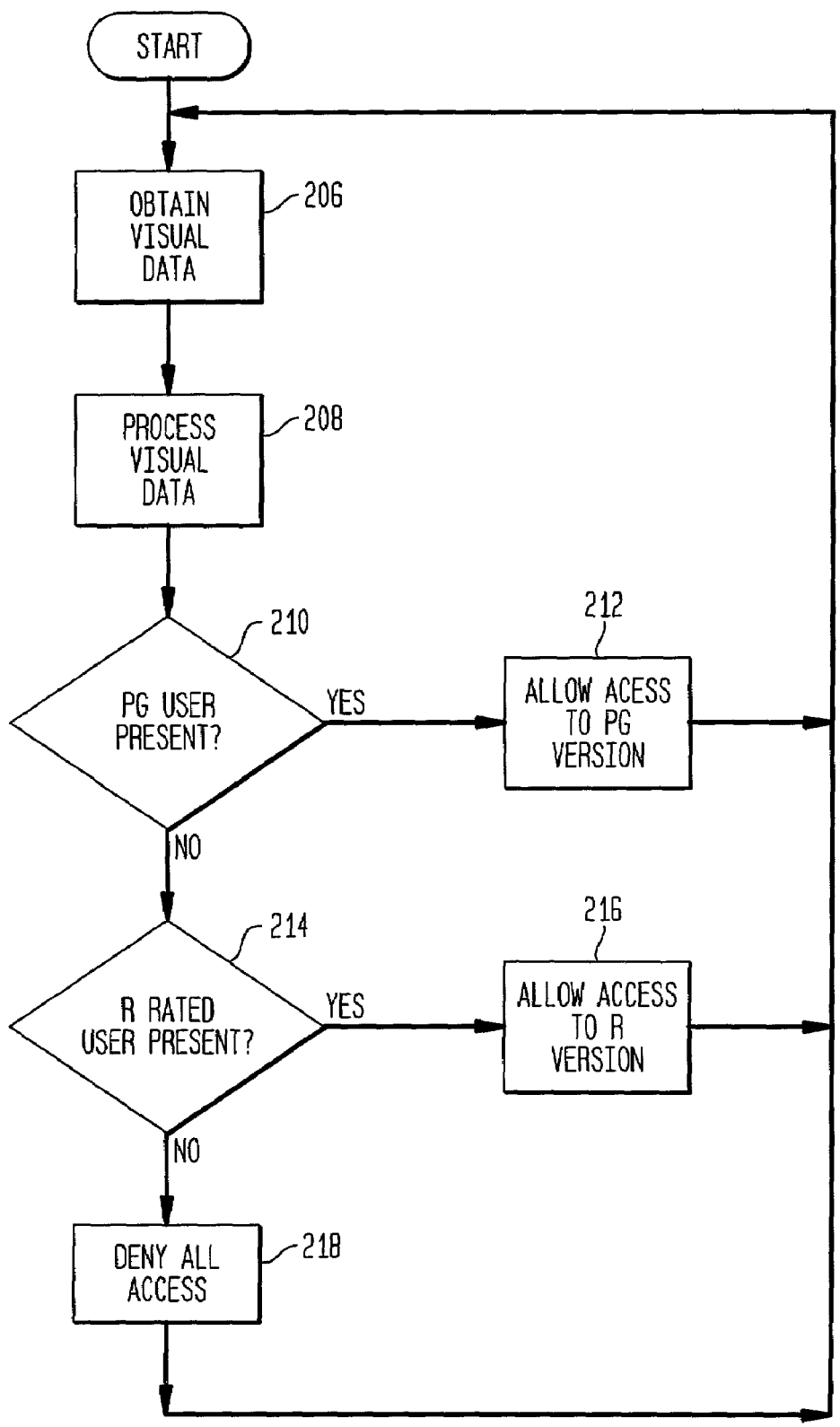
FIG. 2 is an exemplary flow diagram of another embodiment of the method of the present invention.
Figure 7:
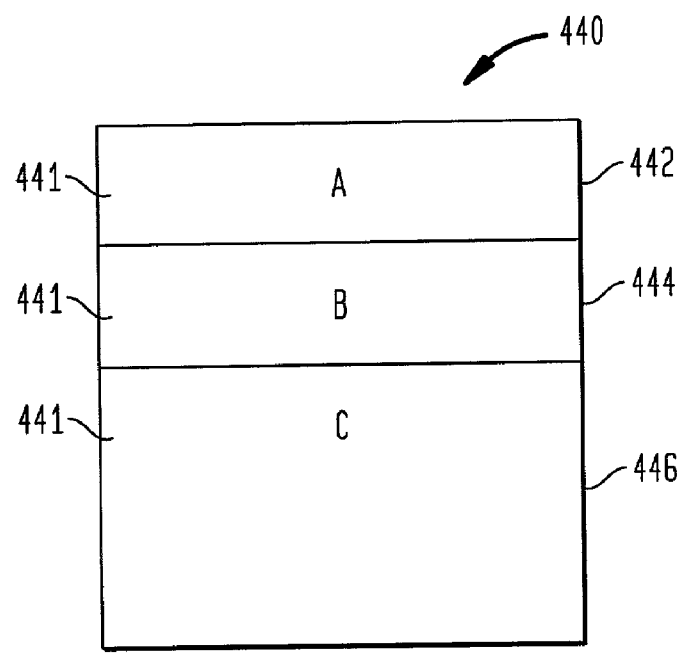
FIG. 7 is a schematic diagram of a DVD player having multiple versions of a movie, in accordance with the prior art.

Referring to FIG. 2, another embodiment of the method of the present invention is shown, directed to a parental lock feature for a DVD player or similar entertainment system. In such a system, as can be seen in FIG. 7, information directed to multiple versions of a movie or performance may be stored on a DVD as is known in the art. In FIG. 7, a media storage device 440 includes media storage portions 441. As is known in the art, portion 442 may contain information directed to scenes from a movie corresponding to the R-rated version of the movie. Similarly, portion 444 may contain information directed to a PG version of the movie. Portion 446 may contain information that is included in both the PG and R versions of the movie. In this manner, both an R rated and PG rated version of a movie may be efficiently stored on a media storage device such as a DVD. Alternatively, it is known to store both the full R-rated version and PG-rated version of a movie on a DVD or other media storage device. Through a parental lock feature a movie may be viewed in the locked PG format so that children may watch the movie without accessing the R-rated version.

Returning now to FIG. 2, the present method is shown being directed to a parental lock feature with regard to a DVD. First, visual data is obtained related to the appearance of a user or users of the DVD player (as is shown in step 206). Next, the visual data is processed to determine the authorization level of the users (as is shown in step 208). If it is determined that a user is present who is authorized to view the PG-rated version of the movie, such as a young adult (as is shown in step 210), access to the PG version of the movie is allowed (as is shown in step 212). If, however, no user is present who is authorized to see only a PG version of the movie, it is then determined if a user authorized to see an R-rated version of the movie, such as an adult, is present (as is shown in step 214). If such a user is present, then access to the R-rated version of the movie is allowed (as is shown in step 216). If it is determined that neither a user authorized to view and R-rated version or a user authorized to see a PG version of the movie is present, then access to any version of the movie is denied (as is shown in step 218).

While the above discussed embodiment of the present invention is used in conjunction with a media device having two versions of a movie, PG-rated and R-rated, the present method may also be used with a more sophisticated method of limiting access to a movie or similarly to a video game. The voluntary movie rating system currently rates movies and divides them into five major categories. These categories are G for general audiences (all ages admitted), PG for parental guidance suggested (some material may not be suitable for children), PG-13 for parents strongly cautioned (some material may be inappropriate for children under 13), R for restricted (under 17 requires accompanying parent or adult guardian), and NC-17 (no one 17 and under admitted). Additionally, some films with highly graphic content are also given an X rating or no rating.

Figure 3:
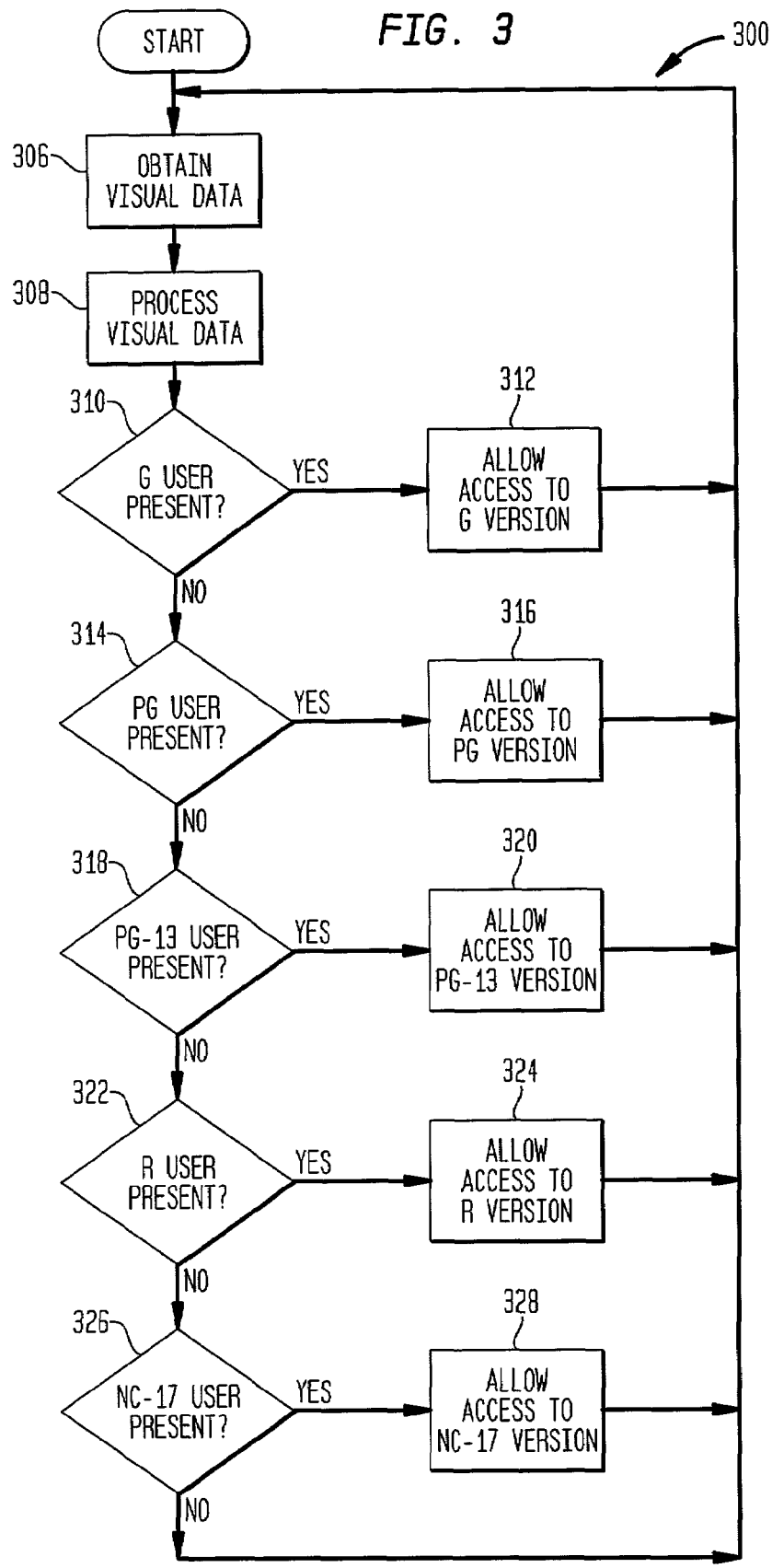
FIG. 3 is an exemplary flow diagram of another embodiment of the method of the present invention.

In a manner similar to that described above with regard to a media storage device having both PG and R-rated versions of a movie, the media storage device may be further segmented to have G, PG, PG-13, R and NC-17 versions of a movie. Referring to FIG. 3, another embodiment of the method of the present invention is shown. First, as discussed in the previously discussed embodiments, visual data related to the appearance of a user is obtained (as is shown in step 306). Then, the visual data is processed to determine if particular authorized users are present (as is shown in step 308). Next, it is determined if a user authorized to see the G-rated version of the movie is present (as is shown in step 310). If such a user is present, then access to the G-rated version of the movie is allowed (as is shown in step 312). Otherwise, it is then determined if a user authorized to view a PG-rated version of the movie is present (as is shown in step 314). If such a user is present, then access to the PG version of the movie is allowed (as is shown in step 316). Otherwise, it is then determined whether a user authorized to view PG-13 version of a movie is present (as is shown in step 318). If such a user is present, then access to the PG-13 version of the movie is allowed (as is shown in step 320). Otherwise, it is determined whether a user authorized to see only up to R-rated versions of the movie is present (as is shown in step 322). If such a user is present, then access to the R-rated version of the movie is allowed (as is shown in step 324). Otherwise, it is determined whether a user authorized to see an NC-17 version of the movie is present (as is shown in step 326). If such a user is present, then access to the NC-17 version of the movie is allowed (as is shown in step 328). If no user authorized to see an NC-17 version of the movie is present, then no access is allowed and the method begins the cycle again with the obtaining of visual data pertaining to the users of the device. In this way, when a movie is being viewed by multiple users, with viewers of different ages entering or exiting a room, the movie may dynamically change versions so that the most appropriate version of the movie is always displayed. The same method or system may be used with video games, with different versions of the graphic interface being available to users authorized for certain different levels of maturity or viewing.

Figure 4:
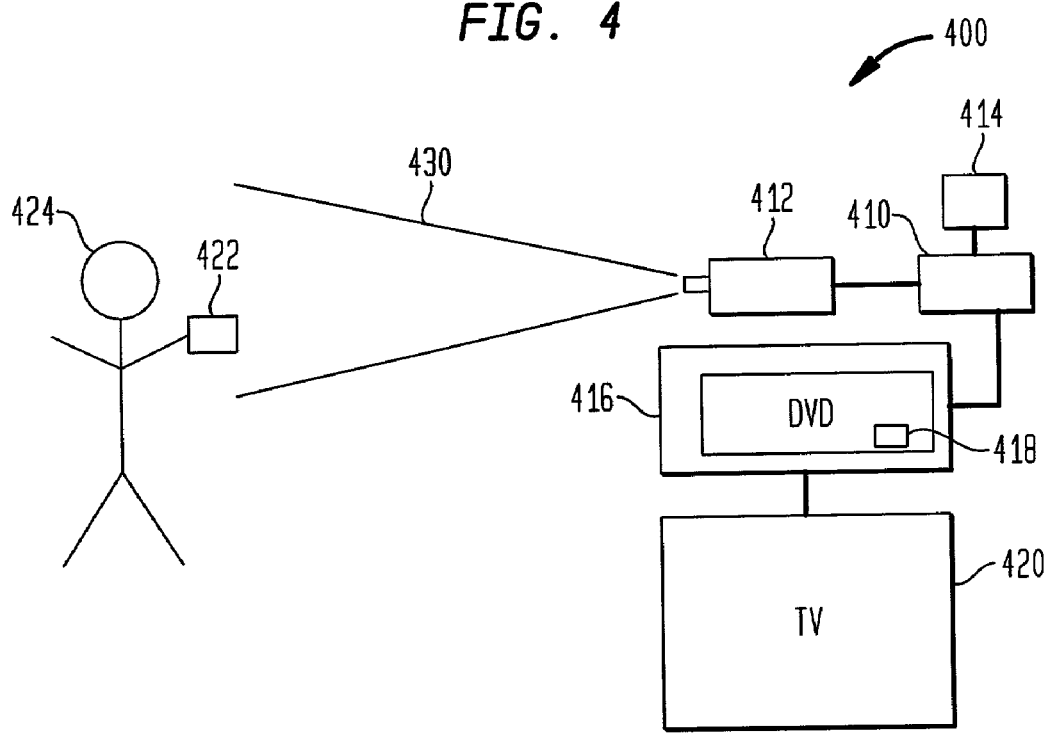
FIG. 4 is a schematic diagram of an embodiment of the present invention with an authorized user in the field of view of the camera.
Figure 5:
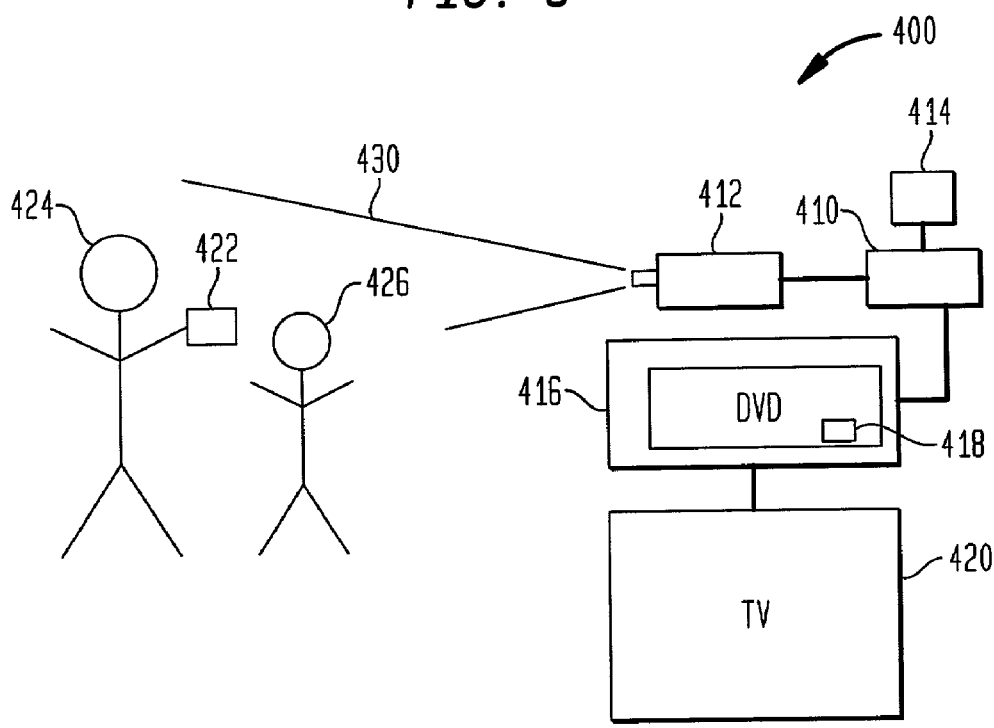
FIG. 5 is a schematic diagram of the embodiment of FIG. 4, with an unauthorized user in the field of vision of the camera in addition to an authorized user.
Figure 6:
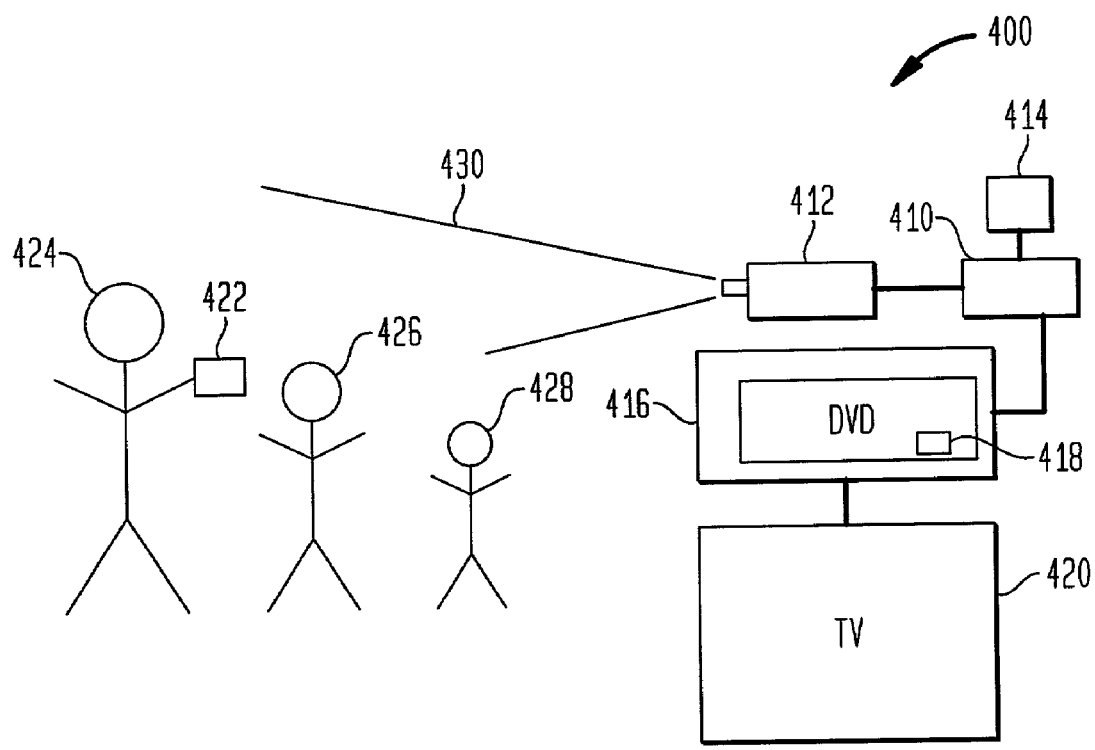
FIG. 6 is a schematic diagram of the embodiment of the invention of FIG. 4 with three users in the field of vision of the camera.

Referring to FIG. 4, there is shown an implementation of the present invention making use of a DVD viewer 400. DVD player 416 is shown connected to a television 420. The DVD player 416 has, disposed within, a DVD 418. The DVD may be of a type as described previously having multiple versions of a movie for viewing by different aged or authorized viewers. A camera 412 is situated such that its field of vision 430 encompasses an area wherein viewers of the television 420 would normally be situated. Camera 412 is connected to computing device or logic controller 410 which processes visual data, stores this data, performs comparisons of the obtained data with data pertaining to authorized users, as well as other functions. Logic controller 410 is electrically connected to DVD player 416.

In use, an authorized user 424 may move into the field of vision 430 of camera 412. Authorized user 424 may then press the remote control 422 initializing receiver 414 which is connected to logic controller 410. Authorized user 424 may press a button or sequence of buttons on remote control 422, thus initializing logic controller 410 and initiating a sampling of visual data of the facial features of authorized user 424 by camera 412. This visual data will then be stored in logic controller 410. Subsequently, authorized user 424 may turn on DVD player 416 to watch the movie, stored on DVD 418, on television 420. The camera 412 will obtain visual data pertaining to the facial features of authorized user 424 and this data will be processed by logic controller 410. Logic controller 410 may determine that authorized user 424 is authorized to view the movie on DVD 418 and may initiate a signal to DVD player 416, thus allowing access to the movie. In this fashion, authorized user 424 may then proceed to watch the movie.

If, while authorized user 424 is watching the movie, or is watching an R-rated version of the movie, another viewer, for example a young adult 426, enters the room and the field of vision 430 of camera 412, the visual data pertaining to the facial features of young adult 426 will be obtained by camera 412 and processed in logic controller 410. This data will be processed in addition to the data obtained from authorized user 424. That is, camera 412 may obtain visual data from multiple users substantially contemporaneously. If young adult 426 does not have the authority to view the movie, the logic controller 410 will signal DVD player 416 and access to the movie will be blocked. If the movie is such that multiple versions of the movie are stored on the DVD, and the young adult, for example, is authorized to watch a PG version of the movie, then logic controller 410 may send the signal instructing DVD player 416 to change from displaying the R-rated version of the movie on DVD 418 to the PG-rated version of the movie. If the logic controller 410 does not find data corresponding to young adult 426 in its memory, authorization may be blocked or, for example, a temporary flashing message may appear on the screen giving the authorized adult viewer 424 time to allow access for young adult 426. This may be done by the authorized adult viewer 424 punching a code into remote control 422 allowing the camera 412 to obtain visual data regarding young adult 426 and store it in logic controller 410 along with corresponding authorization information. Further, in this manner, the adult authorized user 424 may enter in the desired access level or authorization level for young adult 426 such as "authorized for PG viewing" or "authorized for G-rated viewing" or "not authorized at all".

In a similar fashion, while adult authorized viewer 424 is viewing the movie along with young adult PG-authorized viewer 426, another viewer such as a small child 428 may also enter the room and the field of vision 430 of camera 412. In a manner similar to that discussed previously with respect to young adult 426 entering the field of vision while adult 424 was watching the movie, small child 428 will also have his or her facial characteristics obtained through the visual data by camera 412 and processed by logic controller 410. Again, adult user 424 may use a remote control 422 in order to provide initialization of the authorization step for small child 428. Once all or most of the frequent viewers of the television system have been entered into the access limiting device, continued access to the movie may be limited on a dynamic real-time continuous basis. For example, an adult may be watching an R-rated movie and may temporarily leave the room in order to get a snack or for various other reason. At this time, a child may enter the room while the movie continues to play. In this scenario, the system of the present invention could either suspend viewing of the movie or downgrade the rating level of the movie to that allowable to be viewed by the user entering the room. In this manner, constant adult supervision is not needed in order to limit access of certain programs to children while still providing instant access to movies and programming by an adult without cumbersome passwords and other control features.

As will be appreciated by one skilled in the present art, the method of the present invention may be used for controlling a set-top box, such as, for example, a cable television controller box, or a television set to deny access to certain television channels.

As mentioned above, as new users enter the field of vision, such as guests of the adult or relatives or guests of the children, the authorized user may use the remote control in order to grant viewing rights of different levels of authority to the new users.

Further, remote control 422, as described herein, need not be a hand held device, but, alternatively, may be integrally formed with the logic controller, or may take any other form deemed appropriate by one skilled in the art. Additionally, remote control 422 need not be activated by buttons, but alternatively, may be voice activated or visually activated, in a manner known to those skilled in the art.

Figure 8:
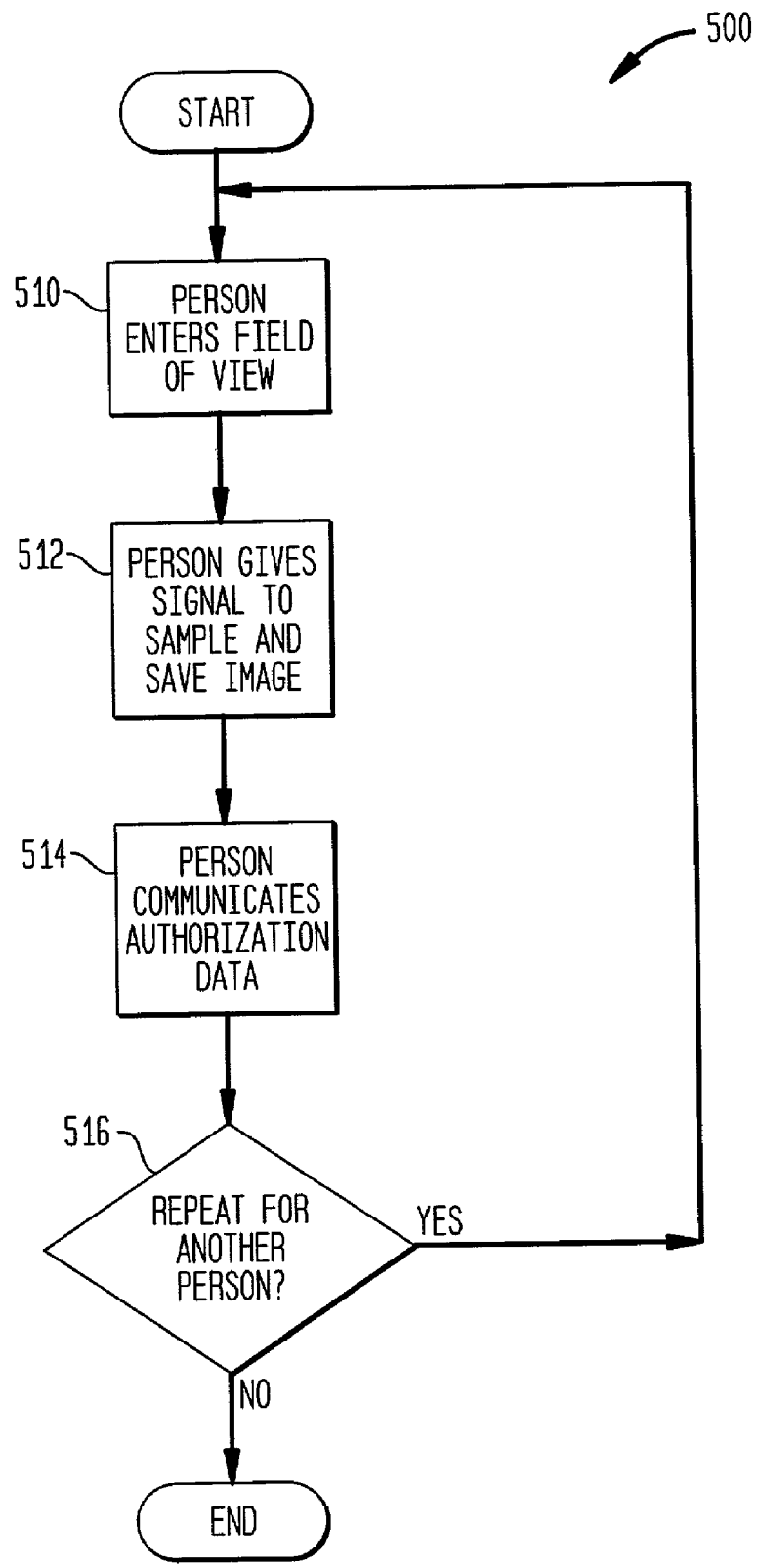
FIG. 8 is an exemplary flow diagram of another embodiment of the present invention.

Referring to FIG. 8, a method is shown whereby a user may initially become an authorized user. First, a user enters the field of vision of the camera (as is shown in step 510). The user then gives a signal to obtain and save a visual data image (as is shown in step 512). The user then communicates authorization data via the remote control or other such device. The authorization data may include but is not limited to birth date, age, access level or other pertinent information (as is shown in step 514). This process may be repeated for multiple users such as multiple family members, friends or colleagues who may come over to a home or office, or other such users (as shown in step 516). Additionally, the authorized user may simply override the denial of access without entering in authorization data regarding a new user and allow access to viewing.

Figure 9:
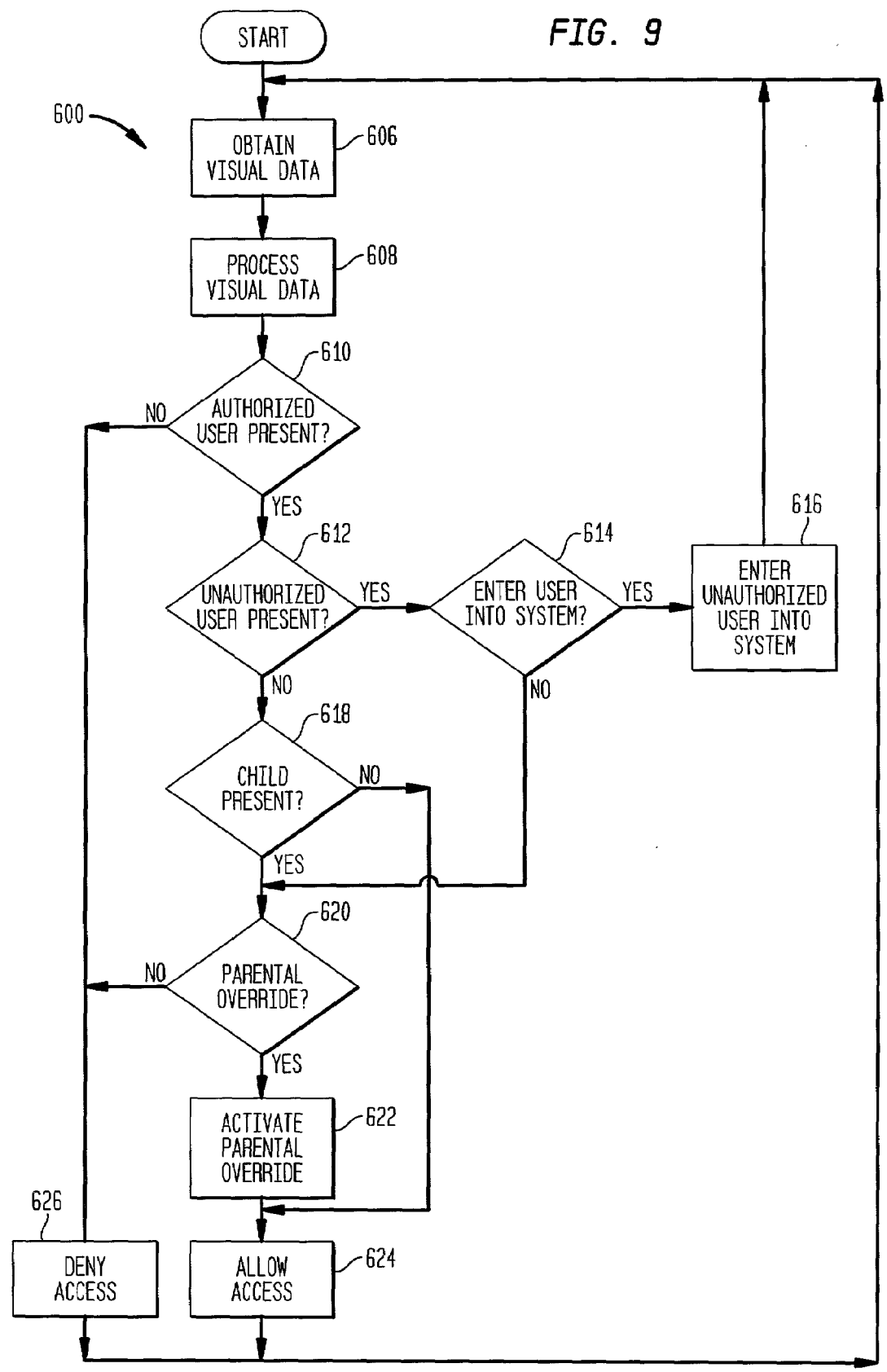
FIG. 9 is an exemplary flow diagram of another embodiment of the present invention.

This process of overriding the denial of access as well as the alternative of entering unknown users into the system is shown in FIG. 9. In FIG. 9, another embodiment is shown of the present invention 600. Visual data is obtained pertaining to the facial features of users (as is shown in step 606) as was discussed in the previously discussed embodiments. The visual data is then processed (as is shown in step 608). It is then determined whether a known or authorized adult user is present (as is shown in step 610). If no known or authorized adult user is present, then access is denied (as is shown in step 626). If however, a known or authorized adult user is present, it is then determined whether an unknown or unauthorized adult is also present (as is shown in step 612). If an unknown or unauthorized adult is present, the authorized adult is then queried as to whether the authorization data for the unknown adult should be entered into the system (as is shown in step 614). If the authorized adult decides to enter in authorization data pertaining to the unauthorized adult, he or she then proceeds to enter in this data (as is shown in step 616). This process may be similar to that as discussed above with regard to entering authorization data for new or unknown users. Once data regarding an unauthorized user who is an adult is entered into the system, the process is then begun again. If however the authorized user decides not to enter authorization data pertaining to the unauthorized adult (as is shown in step 614), then the authorized adult user is queried as to whether he wishes to use the parental override function (as is shown in step 620). If the authorized adult decides not to use the parental override function, then access is denied (again, as is shown in step 626). If however, the authorized adult decides to use the parental override function, then he accesses the override (as is shown in step 622) and access is allowed (as is shown in step 624).

In an alternate scenario, if an authorized adult is present (as is shown in step 610) and no unknown or unauthorized adult is present, the system then determines whether a child is present (as is shown in step 618). If no child is present, then access is allowed. If, however, a child is present, then the authorized adult may either use the parental override and allow access (as is shown in steps 620, 622 and 624) or decide not to use the parental override and deny access (as is shown in step 626).

Figure 10:
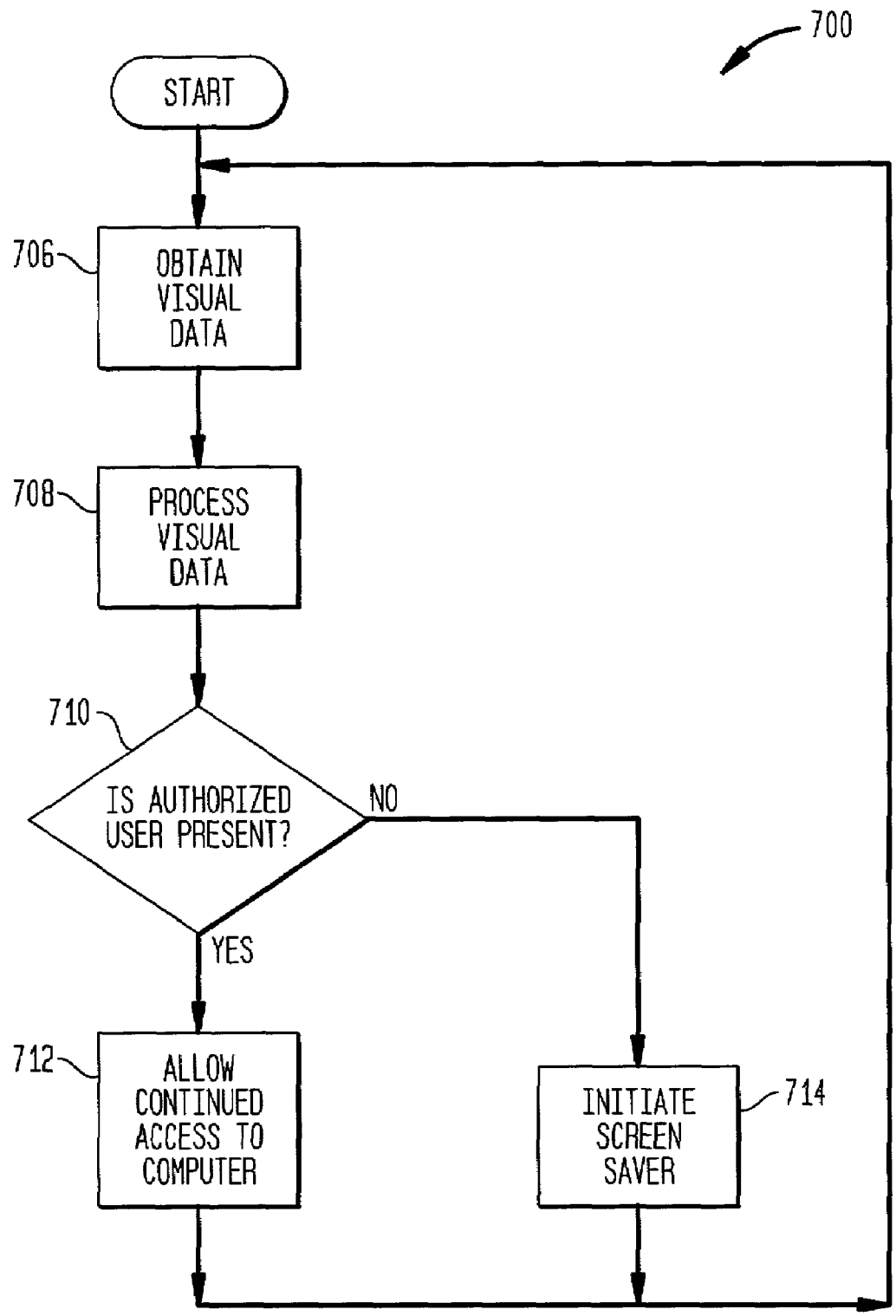
FIG. 10 is an exemplary flow diagram of another embodiment of the present invention.

In another embodiment, the method and system of the present invention may be used to limit access to a personal computer. FIG. 10 depicts this embodiment 700. With regard to the computer, visual data is first obtained (as is shown in step 706). This information is then processed (as is shown in step 708). It is then determined whether an authorized user is present (as is shown in step 710). If an authorized user is present, then access to the computer is allowed (as is shown in step 712). If, however, an authorized user is not present, then a screen saver is initiated (as is shown in step 714). This process may then be repeated in a cyclic, recursive, or repeated manner to continuously check for the presence of an authorized user and to activate a screen saver if that user, once being present, later leaves the area.

Figure 11:
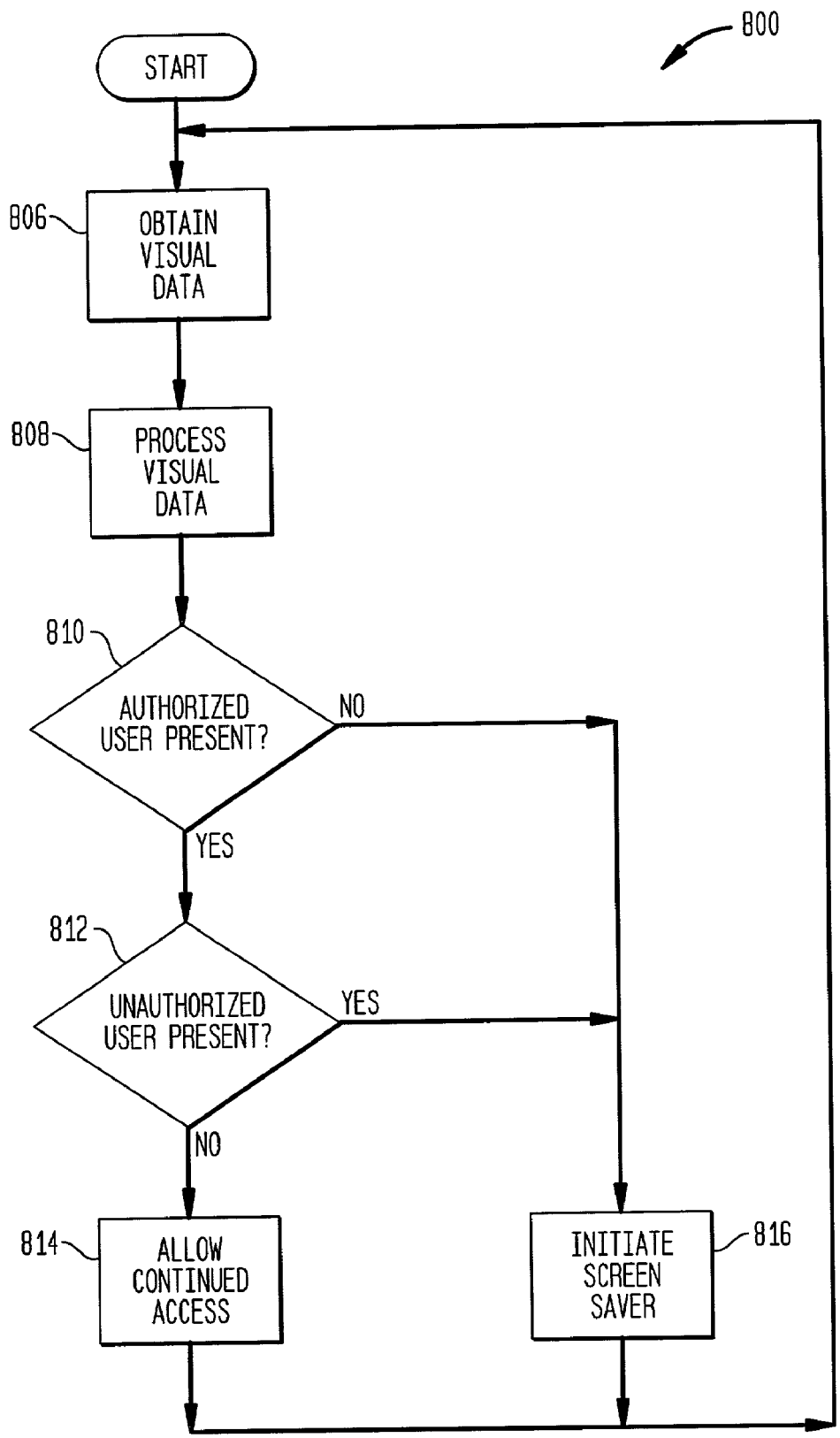
FIG. 11 is an exemplary flow diagram of another embodiment of the present invention.

Another embodiment 800 of the present invention directed to use with a computer is shown in FIG. 11. First, as is the case with the previously mentioned embodiments, visual data pertaining to the users of the computer is obtained (as is shown in step 806). This visual data is then processed (as is shown in step 808). It is then determined whether an authorized user of the computer is present (as is shown in step 810). If no authorized user is present, then a screen saver is initiated (as is shown in step 816). If an authorized user is present, it is then determined whether an unauthorized user is also present (as is shown in step 812). If an unauthorized user is present, then a screen saver is initiated (as is shown in step 816). In this manner, an unauthorized user of the computer is blocked from viewing data even in the presence of an authorized user. This method and system prevents an unauthorized user from surreptitiously looking over the shoulder of an authorized user. If an authorized user is present and no unauthorized user is present, then access to the computer is allowed (as is shown in step 814). As with the previously discussed embodiments, this process may be performed in a repeated manner. In an exemplary embodiment, the process may be repeated in a real-time or near real-time manner so that the authorization status of present users is continuously and dynamically updated and continued access to the computer is limited accordingly. It will be apparent to one skilled in the art that frequency, with which the process is repeated, as well as whether it is repeated in a periodic or non-periodic manner, will be an application specific determination, based on the specific circumstances of the particular application.

Figure 12:
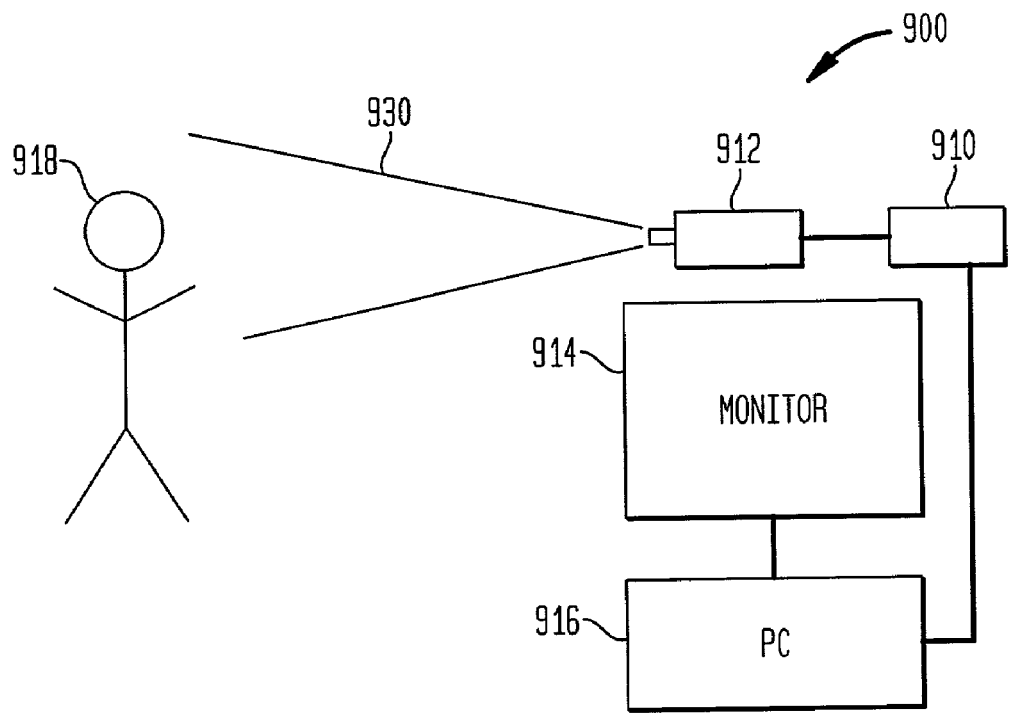
FIG. 12 is a schematic diagram of another embodiment of the present invention, wherein the invention is used with a computer.

In FIG. 12, an embodiment 900 of the present invention is shown directed to use in conjunction with a computer 916. In this embodiment, a camera 912 is connected to logic controller 910 which in turn is connected to computer 916 having monitor 914. As in the embodiments discussed previously, an authorized user 918 enters into field of vision 930 of camera 912. Visual data pertaining to the appearance of user 918 is obtained by camera 912. This visual data is then processed by logic controller 910. Once it is determined that authorized user 918 is authorized, then logic controller 910 may communicate a signal to computer 916 granting access to the computer. If, however, authorized user 918 leaves the field of vision 930 of camera 912, then visual data obtained will not include the appearance of authorized user 918 and logic controller 910 will initiate a signal to computer 916 initializing a screen saver or other security measures so that access to the computer 916 and a view of data on monitor 914 may not be obtained.

Figure 13:
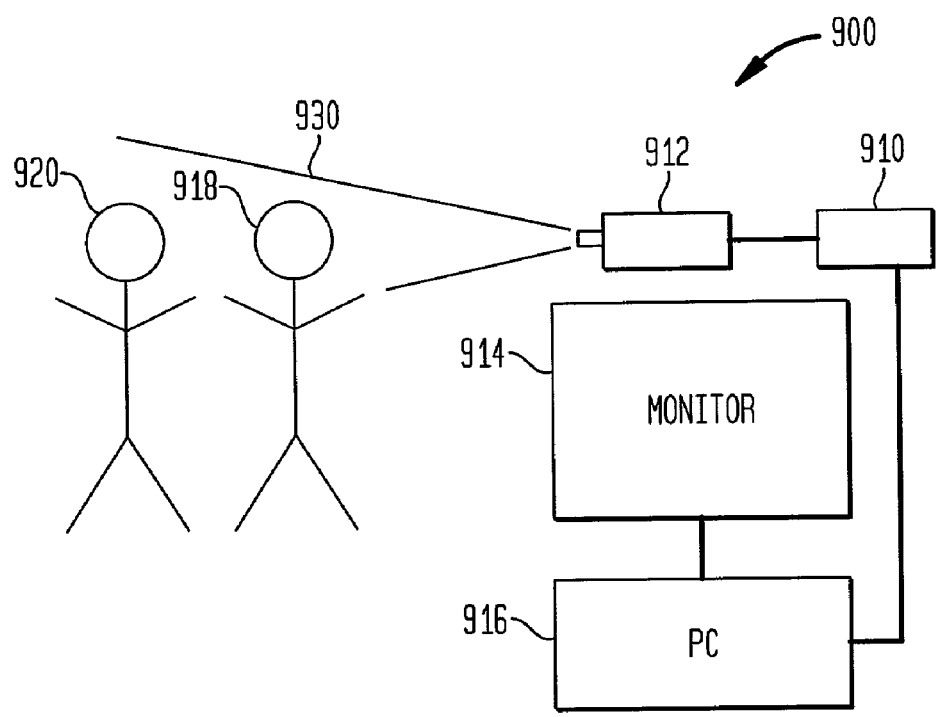
FIG. 13 is a schematic diagram of the embodiment of the invention shown in FIG. 12 with two users in the field of view of the camera.

As is shown in FIG. 13, if unauthorized user 920 enters field of vision 930 along with authorized user 918 to, for example, secretly look over authorized user 918's shoulder, then visual data pertaining to both authorized user 918 and unauthorized user 920 will be obtained by camera 912 and logic controller 910 will make a determination to initiate a screen saver and deny access to computer 916.

Figure 14:
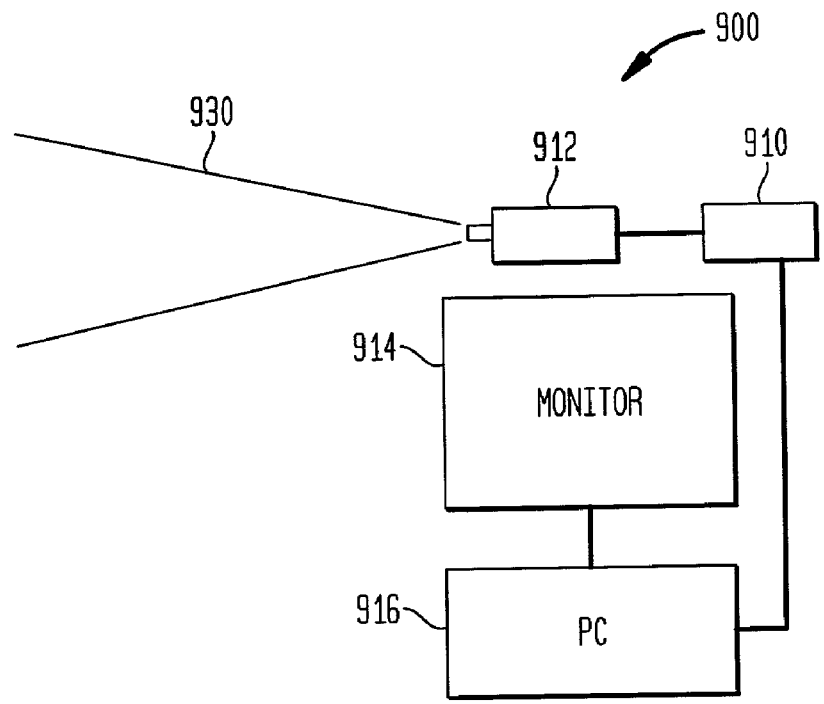
FIG. 14 is a schematic diagram of the embodiment of the invention shown in FIG. 12 with no users in the field of view of the camera.

Similarly, as is shown in FIG. 14, if authorized user 918 leaves the field of vision 930, then camera 912 will obtain visual data not correlating with the visual appearance of authorized user 918 and logic controller 910 will initialize a screen saver or other security measures in computer 916.

Figure 15:
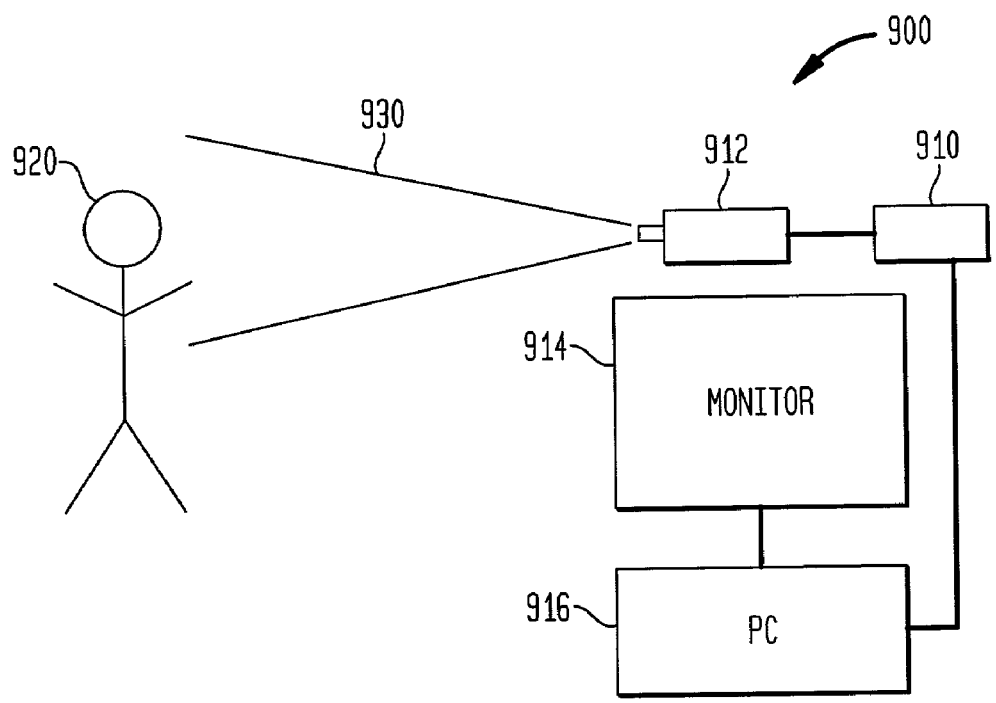
FIG. 15 is a schematic diagram of the embodiment of the invention shown in FIG. 12 with one user in the field of view of the camera.

As is shown in FIG. 15, if unauthorized user 920 should enter field of vision 930 to attempt to view computer 916 and monitor 914 in the absence of authorized user 918, then camera 912 will obtain visual data pertaining to the appearance of unauthorized user 920 and logic controller 910 will continue to send a signal initializing a screen saver or other security measures in computer 916 and monitor 914.

Figure 16:
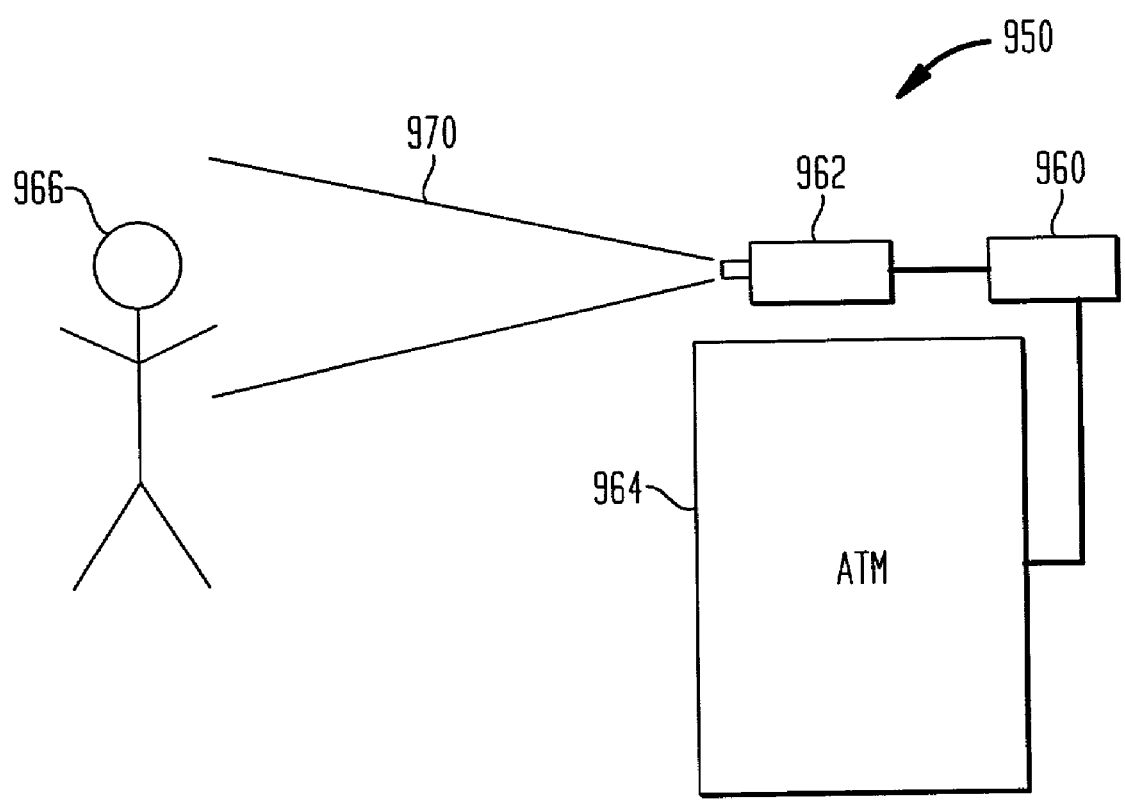
FIG. 16 is a schematic diagram of another embodiment of the present invention being used in conjunction with an ATM machine.

Alternatively, the present method may be used in other technologies requiring limiting of access. For example, as shown in FIG. 16, the present invention is used in conjunction with an ATM machine 964. When an authorized user 966, approaches and stands in front of the ATM machine 964, in field of view 970, camera 962 obtains visual data pertaining to the facial features of the user 966, and this data is processed and logic controller 960 determines whether the user is an authorized user. If the user 966 is an authorized user, the identity of the user is determined so that appropriate account information may be accessed. When the user leaves the ATM machine 966 after performing the desired function such as withdrawing money or checking account balances, a security function may be enabled and access to the ATM machine 966 may be discontinued. Thus, the method and system of the present invention enables the user 966 to access the ATM machine quickly and efficiently without having to repeatedly remember or type in a password. Additionally, if an unauthorized user (not shown) approaches the ATM and enters the field of vision 970 of camera 962, access to ATM machine 964 may be terminated so that an authorized user 966 need not fear that information may be obtained by an unauthorized user peering over his or her shoulder or trying to perform an illegal act. Also, when an authorized user 966 is finished with his or her transaction and leaves the ATM 964, access to the ATM 964 may be automatically and quickly terminated so that an unauthorized user is not able to glean any important information from the ATM.

Thus, while there have been shown and described and pointed out fundamental novel features of the invention as applied to exemplary embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for automatically limiting access to a device to authorized users, the method comprising:
   obtaining visual data related to the appearance of the users of the device;
   automatically processing the visual data to determine when any authorized users of a first authorization level are present;
   automatically processing the visual data to determine when any authorized users of a second authorization level are present;
   allowing initial access to the device at a first authorization level when only authorized users of a first authorization level are present;
   automatically allowing initial access to the device at a second authorization level when any authorized users of a second authorization level are present;
   allowing continued access at a first authorization level when only authorized users of a first authorization level continue be present;
   automatically changing access from a first authorization level to a second authorization level when, at some time subsequent to initial access at a first authorization level being allowed, all authorized users at a first authorization level cease to be present, and any authorized users at a second authorization level are present;
   automatically allowing continued access at a second authorization level when any authorized users of a second authorization level continue be present; and
   terminating access to the device automatically when all authorized users cease to be present.

2. The method of claim 1, wherein the action of processing the visual data includes matching the obtained visual data to known stored visual data, and correlating the known stored visual data with other stored authorization data.

3. The method of claim 1, further comprising:
   terminating access to the device when a potential user other than an authorized user is present.

4. The method of claim 1, further comprising:
   overriding by an authorized user of the first authorization level to allow initial and continued access at a first authorization level when at least one user of a second authorization level is present.

5. A system for limiting access to a device to authorized users, the system comprising:
   a camera for obtaining visual data related to the appearance of potential users of the device; and
   a computing device configured to:
   obtain visual data related to the appearance of the users of the device;
   process the visual data to determine when any authorized users of a first authorization level are present;
   process the visual data to determine when any authorized users of a second authorization level are present;
   allow initial access to the device at a first authorization level when only authorized users of a first authorization level are present;
   allow initial access to the device at a second authorization level when any authorized users of a second authorization level are present;
   allow continued access at a first authorization level when only authorized users of a first authorization level continue be present;
   change access from a first authorization level to a second authorization level when, at some time subsequent to initial access at a first authorization level being allowed, all authorized users at a first authorization level cease to be present, and any authorized users at a second authorization level are present;
   allow continued access at a second authorization level when any authorized users of a second authorization level continue be present; and
   terminate access to the device when all authorized users cease to be present.

6. The method of claim 5, wherein the device is chosen from the group consisting of:
   a DVD player adapted to play a DVD having thereon at least a first version and a second version of a movie, said first version being played when access is allowed at said first authorization level, said second version being played when access is allowed at said second authorization level; and
   a set-top box adapted to facilitate playing of at least a first version and a second version of a movie, said first version being played when access is allowed at said first authorization level, said second version being played when access is allowed at said second authorization level.

7. A system for limiting access to a device to authorized users, the system comprising:
   a biometric device for obtaining identity data related to potential users of the device; and
   a computing device coupled to said biometric device and configured to:
   process the identity data to determine when any authorized users of a first authorization level are present;
   process the identity data to determine when any authorized users of a second authorization level are present;
   allow initial access to the device at a first authorization level when only authorized users of a first authorization level are present;
   allow initial access to the device at a second authorization level when any authorized users of a second authorization level are present;
   allow continued access at a first authorization level when only authorized users of a first authorization level continue be present;
   change access from a first authorization level to a second authorization level when, at some time subsequent to initial access at a first authorization level being allowed, all authorized users at a first authorization level cease to be present, and any authorized users at a second authorization level are present;
   allow continued access at a second authorization level when any authorized users of a second authorization level continue be present; and
   terminate access to the device when all authorized users cease to be present.

8. The system of claim 7, wherein the biometric device is chosen from the group consisting of a finger print reader, a retinal scanner, a palm scanner and a voice recognition unit.

* * * * *